United States Patent Office 2,880,100
Patented Mar. 31, 1959

2,880,100

METHODS FOR THE MANUFACTURE OF LIGHT-WEIGHT CONCRETE

Leo Torsten Ulfstedt, Sodertalje, Sweden, assignor, by mesne assignments, to Casius Corporation Limited, Montreal, Quebec, Canada No Drawing. Application October 6, 1952
Serial No. 313,365

Claims priority, application Germany October 9, 1951

16 Claims. (Cl. 106—86)

The present invention concerns the manufacture of porous light-weight concrete.

As is well known, light-weight concrete is produced from aqueous mixtures of finely divided binders, such as Portland cement, natural cement, blast furnace slag, more or less hydraulic lime and the like, and fine-grained siliceous materials, such as sand, crushed or ground rock or stone, fly ash, ground coke ash, shale ash, pulverized clay brick, argillaceous substances, waste glass etc., which are made porous by the addition of gas developing substances, such as certain metals, or foam producing substances. Due to the comparatively high quantity of water in said mixtures it often takes considerable time before the mass, after being cast into moulds, becomes sufficiently stiff and hard so that it can be subjected to further treatment, for example, being divided into smaller elements by cutting or sawing, being subjected to steam curing, etc.

According to the present invention said hardening of the concrete mass is considerably accelerated by adding to the aqueous raw material mixture a small quantity of a finely divided hydraulic cementitious material which is already in an advanced state of hydration. Of course, what is meant by the term "hydraulic material" as used herein is material capable of being hydrated. As examples of such materials may be mentioned pulverized hydraulic lime, natural cement, Portland cement, aluminous cement, blast furnace slag and similar known hydraulic binders, each per se or in mixture with each other, which material has been treated with water for a sufficient time. Further, it is also possible to employ for this purpose the waste material which is obtained in the above mentioned cutting operation when the cast bodies are divided into smaller elements, said waste containing already hydrated binders.

During the time the hydraulic substance to be hydrated is stored or suspended in water, it must be kept in movement, as by stirring, for example, to prevent binding. When using said waste material, it should be recovered in such an early state of hardening that it still can be suspended in the raw material mixer, or in a special mixer with addition of water.

An especially good hardening accelerating effect is obtained, if the hydraulic substance to be hydrated is subjected to wet grinding together with the siliceous material, and the ground mixture is then stored some time before being added to the other components of the concrete raw material mixture. Also, in case of using the aforesaid waste material, it is of advantage to grind the components together. This strengthens the hardening accelerating effect of the mass. The explanation for the foregoing is apparently that the waste material is not completely hydrated and that in the grinding operation new surfaces of the material are exposed and are capable of reacting with the water, whereby the hydration process is promoted and accelerated.

The time required for storing the hydraulic material in water for obtaining a sufficient degree of hydration is dependent on the nature and fineness of the material and may be within the range of from 10 to 75 hours, for example. Said time of storing may be reduced considerably, if the hydraulic material is ground in the presence of water. This is especially so when the hydraulic material is wet ground together with the siliceous component. Particularly in the case of using hydraulic material which has already been partly hydrated before the grinding, as is the case with the above mentioned waste material, the time necessary for storing is very short, for example, as little as 3 hours.

As examples of the manner of carrying the invention into effect the following may be mentioned.

If it is desired to accelerate the hardening of a batch of light-weight concrete intended for a mould comprising 1 m.$^3$, a suspension of 10 kg. hydraulic lime in 50 liters of water is prepared. This suspension is then left for about 24 hours to allow the lime to hydrate while the suspension is stirred. After that time, the mixture is added to the lightweight concrete batch to accelerate the hardening of the latter.

According to another example, wet ground siliceous material is admixed with 2% Portland cement, based on the dry weight of the siliceous material. This mixture is then stored for about 12 hours in a slurry silo while the mixture is stirred to result in hydration of the cement taking place. When using this slurry for preparing the concrete raw mixture, the time of hardening the latter is reduced to only about 2 hours.

When using aluminous cement instead of Portland cement, the quantity required for obtaining the same result is reduced to 1%.

When using blast furnace slag for accelerating the hardening of the concrete, suitably about 5% thereof is added to the siliceous material, whereupon the mixture thus obtained is ground in the presence of water. The wet ground slurry thus obtained is then stored while stirring for about 72 hours before adding the same to the light-weight concrete mixture.

If it is desired to employ waste material obtained in the cutting operation, as indicated above, it may be suitable to proceed in the following manner: The waste material is suspended in water, stored for 3 hours, and is then added in a quantity of about 15% to the light-weight concrete mixture when casting the latter. In this case the time of hardening is reduced to about 3–4 hours.

I claim:

1. The process of manufacturing porous light-weight concrete which comprises: forming a raw material mixture containing inorganic binders having a high content of lime, finely divided siliceous material, water and a porosity producing agent, and, adding to said aqueous raw material mixture a small amount of a finely divided hydraulic cementitious material already being in an advanced state of hydration, in order to produce a rapid hardening of the mass.

2. The process of claim 1 wherein the said hydraulic cementitious material is selected from the group consisting of hydraulic lime and natural cement.

3. The process of claim 1 wherein said hydraulic cementitious material is selected from the group consisting of Portland cement, aluminous cement and blast furnace slag.

4. The process of manufacturing porous light-weight concrete which comprises: forming a raw material mixture containing inorganic binders having a high content of lime, finely divided siliceous material, water and a porosity producing agent, preparing a separate suspension of a small amount of a hydraulic cementitious material in water, storing said suspension for a time sufficient to allow a substantial hydration of the material to take place, and then adding said suspension of hydraulic cementitious material already being in an advanced state of hydration to the said concrete raw material mixture, in order to produce a rapid hardening of the mass.

5. The process of claim 4 wherein the said suspension is stored for at least about 10 hours before adding the same to the concrete raw material mixture, while stirring the suspension to prevent a binding.

6. The process of claim 1 wherein the said hydraulic cementitious material is supplied in the form of waste material obtained in the manufacture of light-weight concrete and already partially hydrated.

7. The process of manufacturing porous light-weight concrete which comprises: forming a raw material mixture containing a hydraulic binder rich in lime, finely divided siliceous material, water and a porosity producing agent, grinding a hydraulic cementitious material in the presence of water thus obtaining an aqueous suspension thereof, storing said suspension for a time sufficient to allow a substantial hydration of the material to take place, and then adding said suspension of hydraulic cementitious material already being in an advanced state of hydration to the said concrete raw material mixture, in order to produce a rapid hardening of the mass.

8. The process of manufacturing porous light-weight concrete which comprises: forming a raw material mixture containing a binder rich in lime, finely divided siliceous material, water and a porosity producing agent, wet grinding the siliceous component in the presence of a small amount of a cementitious hydraulic material, thus obtaining an aqueous slurry of said materials, storing said slurry under agitation for a time sufficient to allow a substantial hydration of the cementitious hydraulic material to take place, and then adding the said suspension in preparing the said concrete raw material mixture, in order to produce a rapid hardening of the mass.

9. The process of claim 8 wherein the said suspension is stored for approximately 3 hours before adding the same to the concrete raw material mixture, while stirring the suspension to prevent a binding.

10. The process of manufacturing porous light-weight cement which comprises: forming a raw material mixture containing a hydraulic binder rich in lime, finely divided siliceous material, water and a porosity producing agent, grinding Portland cement in the presence of water, thus obtaining an aqueous suspension thereof, storing said suspension for a time sufficient to allow a substantial hydration of the material to take place, and then adding said suspension of Portland cement already being in an advanced state of hydration to the said concrete raw material mixture in order to produce a rapid hardening of the mass.

11. The process of manufacturing porous light-weight concrete which comprises: forming a pore-forming aggregate slurry containing hydraulic cement, grinding a cementitious material in the presence of water, thus obtaining an aqueous suspension thereof, storing said suspension for a time sufficient to allow a substantial hydration of the material to take place, and then adding said suspension of cementitious material, already being in an advanced state of hydration, to the said pore-forming aggregate slurry in order to produce a rapid hardening of the same.

12. A process as set forth in claim 4 in which the small amount of finely divided hydraulic cementious material already being in an advanced state of hydration before being added to the bulk of the concrete raw material mixture has been stored for at least 3 hours while stirring.

13. A process as set forth in claim 8 in which the small amount of finely divided hydraulic cementitious material already being in an advanced state of hydration before being added to the bulk of the concrete raw material mixture has been stored for at least 3 hours while stirring.

14. The process of manufacturing porous light-weight concrete which comprises forming a raw material mixture containing inorganic binders having a high content of lime, finely divided siliceous material, water and a porosity producing agent, using the waste from the cutting and trimming operation, preparing an aqueous suspension of the waste light-weight concrete material being in a state of advanced hydration, said suspension containing about 15% of said waste light-weight concrete material based on the dry components of the concrete mixture, storing the suspension for at least 3 hours while stirring, and adding said suspension to said concrete raw material mixture in order to produce a rapid hardening of the concrete.

15. The process of manufacturing porous light-weight concrete which comprises forming a raw material mixture containing inorganic binders having a content of lime, finely divided siliceous material, water and a gas-producing metal powder, first preparing a suspension of a hydraulic cementitious material in water, storing said suspension for a time sufficient to allow a substantial hydration of the material, and then adding a small amount of the said suspension to a concrete raw material mixture in order to produce a rapid hardening of the mass.

16. The process of manufacturing porous light-weight concrete which comprises forming a raw material mixture containing inorganic binders having a high content of lime, finely divided siliceous material, water and a foaming agent, first preparing a suspension of a hydraulic cementitious material in water, storing said suspension for a time sufficient to allow a substantial hydration of the material to take place, in order to produce a rapid hardening in the molds, adding a small amount of the said suspension to the said concrete raw material mixture, agitating the mixture when blowing air into the mass, and then pouring the mixture into molds.

References Cited in the file of this patent

UNITED STATES PATENTS

| | | |
|---|---|---|
| 939,072 | Ney | Nov. 2, 1909 |
| 1,623,989 | Wikkula | Apr. 12, 1927 |
| 1,976,132 | Larmour et al. | Oct. 9, 1934 |
| 1,997,782 | Windecker | Apr. 16, 1935 |
| 2,081,802 | Anders | May 25, 1937 |
| 2,090,421 | Larmour et al. | Aug. 17, 1937 |
| 2,172,076 | Wolf et al. | Sept. 5, 1939 |
| 2,199,920 | Marzoli | May 7, 1940 |
| 2,248,033 | Wallace et al. | July 1, 1941 |
| 2,456,643 | Napier | Dec. 21, 1948 |

FOREIGN PATENTS

| | | |
|---|---|---|
| 15,115 | Great Britain | of 1889 |
| 305,806 | Great Britain | Feb. 14, 1929 |